United States Patent [19]
Cantone

[11] 3,958,520
[45] May 25, 1976

[54] AGRICULTURAL MACHINE FOR TILLING THE SOIL

[76] Inventor: Natale Cantone, Corso M. Prestinari 162, Vercelli, Italy

[22] Filed: Dec. 20, 1973

[21] Appl. No.: 426,607

Related U.S. Application Data

[62] Division of Ser. No. 85,021, Oct. 29, 1970, Pat. No. 3,779,320.

[52] U.S. Cl................................. 111/6; 111/10; 172/116; 172/120
[51] Int. Cl.²................ A01C 23/02; A01C 7/08
[58] Field of Search............ 172/123, 456, 120, 60, 172/119, 116; 111/10, 85, 7, 6

[56] References Cited
UNITED STATES PATENTS

| | | | |
|---|---|---|---|
| 3,133,598 | 5/1964 | Caldwell | 172/120 X |
| 3,316,865 | 5/1967 | Williams | 172/72 X |
| 3,347,188 | 10/1967 | Richey | 111/10 |
| 3,401,752 | 9/1968 | Nja | 172/456 X |
| 3,538,987 | 11/1970 | Taylor | 111/7 X |
| 3,563,191 | 2/1971 | Youanovich | 111/10 |
| 3,810,434 | 5/1974 | Van Der Levy | 111/10 |

*Primary Examiner*—Stephen C. Pellegrino
*Attorney, Agent, or Firm*—McGlew and Tuttle

[57] ABSTRACT

A main frame is supported, adjacent its rear end, by a pair of wheels, and the front end of the main frame is arranged for connection to the coupling pin of either a conventional tractor, preferably having a power take-off, or of a separate traction and steering assembly. Rotatable ground-engaging agricultural implements are supported on the main frame and are motor-driven. The main frame supports other agricultural components such as tanks containing soil-treating materials, distributing means connected to these tanks, and other ground-working implements.

4 Claims, 5 Drawing Figures

AGRICULTURAL MACHINE FOR TILLING THE SOIL

CROSS-REFERENCE TO PRIOR APPLICATION

This application is a division of co-pending application Ser. No. 85,021, filed Oct. 29, 1970, and now U.S. Pat. No. 3,779,320, issued Dec. 18, 1973.

FIELD AND BACKGROUND OF THE INVENTION

This invention relates to a machine for tilling the soil, embodying coaxial rotary implements adapted to mechanically work the soil by cutting into it to a depth less than the radius of the implements, as the machine progresses along the ground in a direction substantially perpendicular to the axis about which the implements rotate.

An object of this invention is to provide an agricultural machine, embodying rotary implements, that is capable of operating on the soil to a considerable depth and/or on an effective width well above those attainable by means of known machines. It is further an object of this invention to provide an agricultural machine that can operate even on soil that cannot withstand high specific loads, such as rice fields and generally loose soils, and yet can reach a relatively large depth of operation and/or can process strips of ground of large effective width in one passage. A further object of this invention is to provide an agricultural machine embodying rotary implements, which machine has an operative power, available to actuate said implements and consequently mechanically to process the soil, that is large, with respect to its overall weight. Still another object of the invention is to provide an agricultural machine having all the aforesaid features, which can be advantageously provided with auxiliary means to form an operative assembly adapted to carry out, while it progresses along the ground, a complete series of operations to prepare the soil for a new cultivation. The operations including mechanical treatments which advantageously take the place of conventional plowing, in particular to a small and medium depth, and further comprise fertilizing, even deep fertilizing, seeding, application of chemical agents and so forth.

Other objects of the invention will appear ad the description proceeds. The machine according to the invention comprises a main frame supported for translational motion on the ground, an operative assembly embodying rotary implements for working the soil, and connected in an elevationally displaceable positional relationship to the main frame, and a mechanism connected to the main frame for steering and controlling the translational motion.

The aforesaid operative assembly which comprises, as means for mechanically processing the soil, the rotary implements, is positioned rearwardly (with respect to the direction of translation of the main frame when in operation) of the points at which the main frame bears on the ground, in such a way as to be displaceable from a raised inoperative position to operative positions in which the rotary implements penetrate into the ground to a depth controllable according to the particular work that is to be carried out in each individual instance.

The weight of the operative assembly may suffice to cause the implements to sink to the required depths, in which case means are provided to limit their penetration into the ground to the desired level, or the operative assembly may be urged downwardly by pressure means having a controllable stroke. The steering and control mechanism is positioned forwardly of the main frame and may be embodied by a conventional tractor provided with coupling means and power take-off, or may be embodied by a fore train kinematically coupled to the main frame.

Other objects and characteristics of this invention relate to constructive solutions which contribute fully to achieve the aforesaid and other unexpected advantageous results of the machine. These and other important features of the invention will appear in the course of the following detailed description of specific embodiments of the invention, illustrated in the attached drawings which are an integral part of the present description.

DESCRIPTION OF THE PREFERRED EMBODIMENTS

Figure 1:
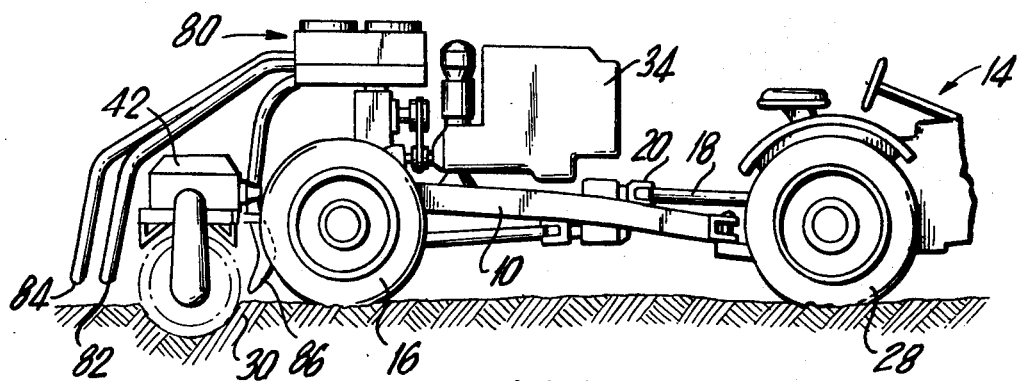
FIG. 1 represents in lateral elevational view and in a diagrammatic form a machine according to one embodiment of the invention, wherein the steering and control mechanism is embodied by a conventional agricultural tractor (fragmentarily illustrated)
Figure 2:
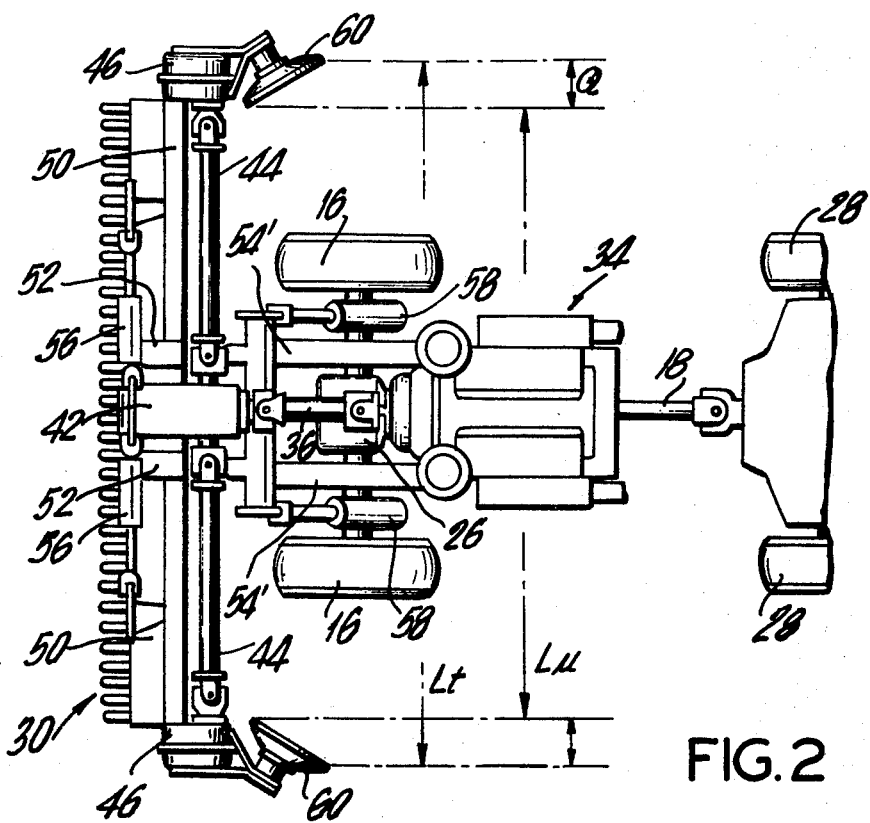
FIG. 2 is a plan view from above of the machine of FIG. 1, in which only the mechanical part of the operative assembly, viz. a hoe assembly, is shown.
Figure 3:
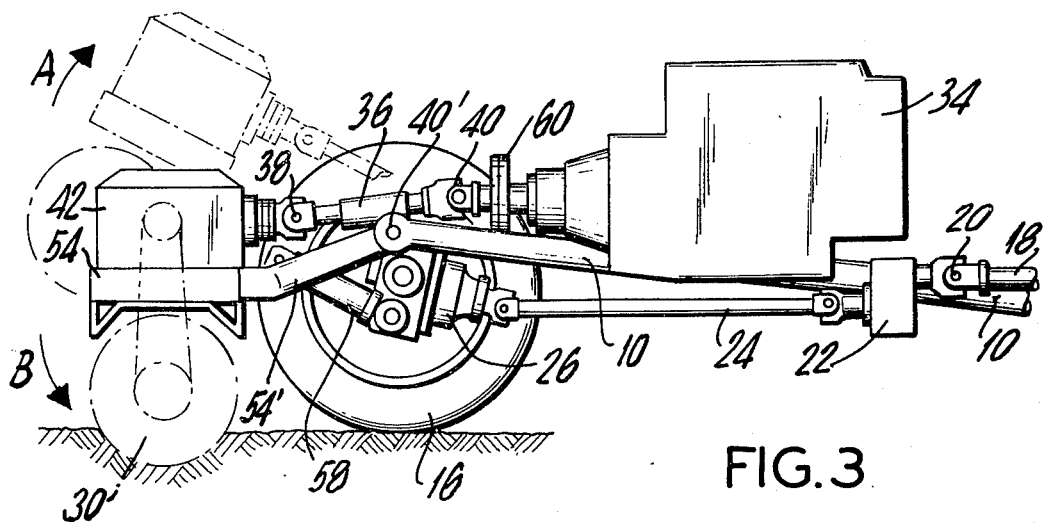
FIG. 3 represents a lateral elevational view to a greater scale than FIG. 1, an embodiment of the mechanical means for the elevational displacement of the hoe assembly with respect to the main frame of the machine parts of the machine obstructing the view of said means having been removed.

The general characteristics of the new machine can be understood from an examination of FIGS. 1 and 2. The machine comprises a main frame 10, the forward end of which — in the embodiment illustrated in these figures — can be connected to the traction hook 12 of a conventional agricultural tractor 14, main frame 10 being supported by a pair of bearing wheels 16 which, whenever decided, can also act as traction wheels inasmuch as they are mechanically connected or connectable to the motor or more exactly to the conventional power take-off of the tractor, by means of a suitable transmission shaft 18, provided with universal or other suitable joints 20. As can be seen in FIG. 3, shaft 18 can be advantageously connected to a transmission box 22, to a secondary shaft 24 and to a differential 26, which can comprise a known mechanism for operatively locking the two bearing (and if desired, traction) wheels 16, to negotiate difficult terrains, and which can also comprise if desired a mechanism for selectively disconnecting the individual wheels, to facilitate turning the machine through small radius curves.

The steering and control assembly, in the case illustrated in FIGS. 1 and 2, is embodied by a tractor 14, conventionally provided with traction wheels 28 and with a steering mechanism (the aforesaid parts not being illustrated), the tractor therefore forming together with the other portions of the machine a functionally unitary assembly, including means for advancing it along the ground, for steering it and for processing the soil.

The operative assembly comprises as an essential part thereof the means for the mechanical processing of the soil, which comprise a set or battery 30 of rotary hoes or the like. These rotary hoes are "per se" of a known type, which, while it can be constructed in a variety of shapes and structures, generally comprises a substantially plane rotary support member, e.g. a disc or plate, and operative members such as fingers or tines peripherally carried thereby, which extend substantially laterally out of the plane of rotation of the support member, so as to cut into the ground and detach therefrom fragments or clods of a greater or smaller size.

The operative assembly can be raised and lifted with respect to the surface of the ground, with respect to which frame 10 has a fixed elevational position, for the purpose of operating at the desired depths, and of allowing the machine to be moved from one working area to another.

The aforesaid elevational displacements of the operative assembly are imparted to the mechanical part of the assembly viz. to the hoe assembly, and further to the mechanical or nonmechanical apparatus for the agronomic processing of the soil that are supported by the hoe assembly and constitute, together with it, the operative assembly. Obviously, the means for feeding the apparatus (such as tanks, pumps and the like), are advantageously directly supported by main frame 10. As shown by way of example in FIG. 3 (wherein the raised position of the hoe assembly is fragmentary shown in fragmentarily lines) secondary frame 54 of the hoe assembly is connected to main frame 10 through hinges (having a transverse axis passing through a joint 40') by means of sturdy arms 54', and mechanical devices for instance hydraulic rams 58, are provided for lifting and lowering the hoe assembly, as indicated at A and B respectively, whenever and to the extent desired. The rams exert an upwardly pressure and have a controllable stroke so as to support the assembly when raised and so as to limit its downward displacement and therefore its penetration into the ground, to the extent desired in each case.

Figure 4:
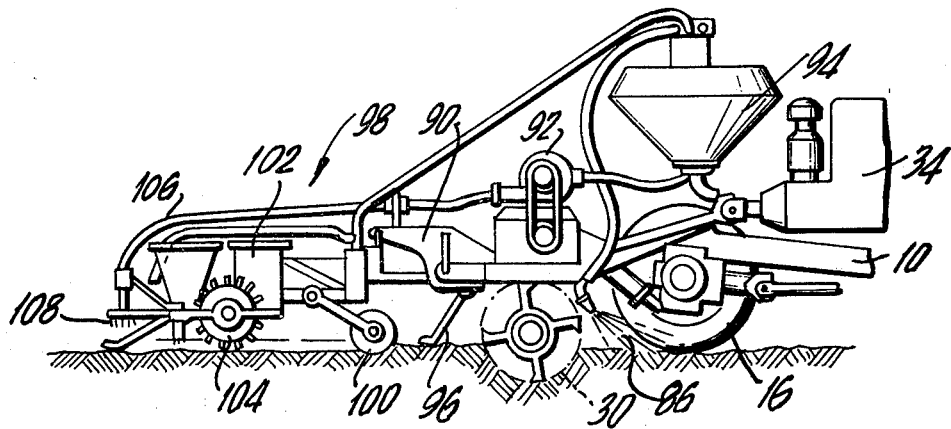
FIGS. 4 and 5 represent complementary apparatus for agronomic treatments which can be interchangeably and removably comprised in the operative assembly for the purpose of carrying out complete agricultural treatments, for example, for the planting of maize and respectively of wheat, as well as the means for feeding the apparatus.
Figure 5:
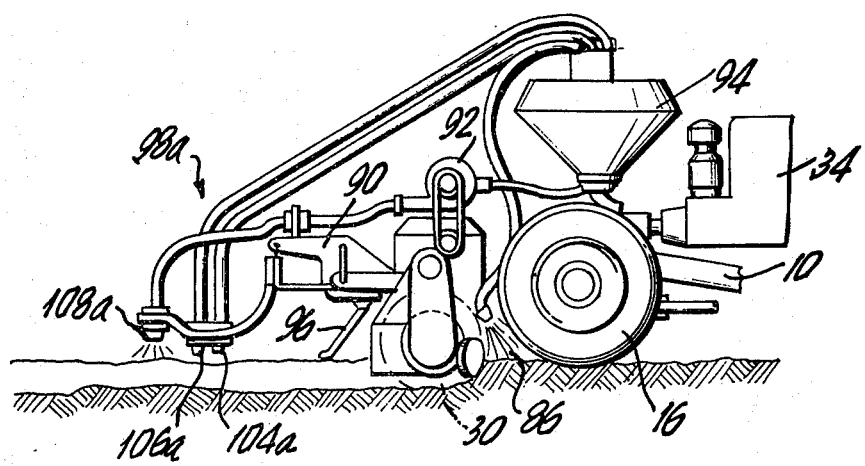

The mechanism illustrated for lifting and lowering the hoe assembly can obviously be replaced by another of like effect. Since the machine according to the invention has an unexpectedly high productivity and can be used to carry out a wide variety of agricultural operations in one passage on the ground, including treatments of the soil in depth and several treatments in mutual immediate succession and combination, it can be advantageously provided with a plurality of auxiliary and complementary means. Thus, as schematically illustrated in FIG. 1, it can be provided with an agronomic treatment apparatus 80 (which can be constructed by means known in the art) provided with pumps or other suitable devices actuated by means of transmissions powered by operative motor 34, and embodying tanks, containers, distributors, as 82 and 84, and other means, e.g. for the purpose of applying fertilizers, seeds and so on, on the rear of the hoe battery 30, where means for the deep seeding, the levelling of the seeded soil and so forth can also be applied. The great depth at which the soil can be processed by means of the rotary implements of the machine according to this invention, has also been found to be surprisingly associated with an unexpectedly different action on the soil itself. While conventional powered hoes act almost exclusively very finely to comminute, pratically to pulverize the soil, the machine according to this invention, operating at a great depth and advancing at a relatively high speed, actually does mechanical work which can be assimilated to a plowing, inasmuch as the soil is cut up and detached in clods which are subsequently covered with soil carried up from underlying layers. The unique operating features of the new machine also allow the useful adoption of means that are traditionally associated with plowing operations. For example, it becomes possible to distribute, by means of distributors 86 located forwardly instead of rearwardly of the rotating hoes, fertilizers and/or additives or soil integrating substances, which, while applied on the surface, are carried down and distributed in depth by the action of the hoe assembly 30. In FIGS. 4 and 5 auxiliary apparatuses are shown which can be interchangeably associated with the machine hereinbefore described, or with any other machine according to this invention, which can be provided for this purpose with a rear bracket 90, having means for attaching and coupling the apparatuses. The machine is further advantageously provided with a pump 92 for feeding herbicides and like agents under pressure.

The fertilizers and like materials can be stored and transported in a suitable multiple tank 94, provided with connections, pressure feeding means and the like of known kinds. Bracket 90 can also carry a levelling member 96 for levelling the ground after the passage of the hoe assembly 30.

The apparatus illustrated in FIG. 4 and generally indicated at 98, is particularly adapted for processing the soil for the growing of maize, processing being advantageously preceded by a diffused pneumatic fertilization, in front of the hoes, effected by means 86 also fed from tanks 94. Apparatus 98 comprises a roller 100 pre-pressing the ground, a device 102–104 for monogerms seeding, a device 106 for applying fertilizer on the seeded rows, and a device 108 for applying an herbicide and/or for localized pneumatic fertilization.

Apparatus (FIG. 5) for preparing the soil for the growing of wheat, can comprise a simpler bearing structure on the rear of the hoe assembly 30 and the levelling device 96, a nozzle 104a for seeding, for example pneumatic seeding, and a nozzle 106a for pneumatic localized application of fertilizer, all these parts being followed by device 108a for the diffused application of herbicides, insecticides and the like.

While specific embodiments of the invention have been shown and described in detail to illustrate the application of the principles of the invention, it will be understood that the invention may be embodied otherwise without departing from such principles.

I claim:

1. A machine for treating the soil comprising, in combination, a main frame; wheels supporting said main frame for translational movement over the ground; an operative assembly, including implements rotatable about a horizontal axis perpendicular to the direction of said translational movement, operable to break and work the soil; means pivotally mounting said operative assembly on said main frame for pivoting about a horizontal axis for elevational displacement of said operative assembly relative to said main frame;

motor means supported on said main frame and operatively connected to said rotatable implements to rotate the latter in a direction impelling said machine forwardly; a steering assembly; means pivotally connecting said steering assembly to said main frame; said steering assembly including driving wheels, means for steering said driving wheels, and motor means operatively connected to said driving wheels; whereby said steering means is operable to control the direction and speed of the translational movement of said machine; tank means for carrying fertilizer material, supported by said main frame; means operable to diffuse fertilizer material from said tank means onto the ground in front of said rotatable implements for working into the soil thereby; and interchangeable means carried by said operative assembly rearwardly of said rotatable implements for further treating the soil worked by said rotatable implements; said interchangeable means including means operable to supply seed to the soil.

2. A machine for treating the soil, as claimed in claim 1, in which said interchangeable means comprises means operable to apply additional fertilizer rearwardly of said rotatable implements.

3. A machine for treating the soil, as claimed in claim 1, in which said interchangeable means comprises soil levelling and soil pre-pressing means engaging the soil rearwardly of said rotatable implements and in advance of said seed applying.

4. A machine for treating the soil, as claimed in claim 1, including means operable to condition the rotatable implements of said operative assembly to engage and mechanically process the soil to a depth of up to 45 centimeters.

* * * * *